United States Patent [19]

Stoy et al.

[11] 4,003,863
[45] Jan. 18, 1977

[54] NOVEL INTUMESCENT COMPOSITION

[75] Inventors: William S. Stoy, Princeton; Shirley H. Roth, Highland Park, both of N.J.

[73] Assignee: Cities Service Company, Tulsa, Okla.

[22] Filed: July 2, 1976

[21] Appl. No.: 702,153

[52] U.S. Cl. .................... 260/2.5 FP; 106/15 FP; 260/2.5 D; 260/2.5 F; 260/18 PN; 260/30.8 DS; 260/32.6 N; 260/32.8 N; 260/32.8 EP; 260/33.2 EP; 260/33.4 EP; 260/830 P; 260/830 S; 260/831; 260/834; 260/836; 427/195; 427/374 R; 428/460; 428/529; 427/531; 427/921; 428/524

[51] Int. Cl.² .......................................... C08J 9/02

[58] Field of Search .......... 260/834, 2.5 FP, 2.5 D, 260/2.5 F

[56] References Cited

UNITED STATES PATENTS 3,899,546   8/1975   Stoy et al. .................... 260/830 P
3,922,251   11/1975  Roth .............................. 260/30.2

Primary Examiner—Morton Foelak
Attorney, Agent, or Firm—Patricia J. Hogan

[57] ABSTRACT

Intumescent amine-aldehyde copolymer/epoxy resin compositions having improved UV stability are obtained by incorporating about 0.5–75% by weight of a polyol polyacrylate or polyol polymethacrylate into an intumescent composition comprising (A) a low molecular weight, water-insoluble amine-aldehyde copolymer consisting essentially of repeating units which correspond to the formula:

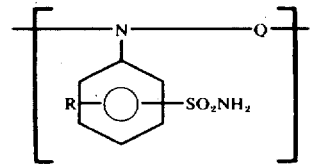

wherein Q is the residue of an alkanal containing 1–5 carbon atoms and R is hydrogen, alkyl, haloalkyl, alkoxy, haloalkoxy, halo, nitro, acetamido, or sulfonamido and (B) an epoxy resin. The preferred compositions are those in which the amine-aldehyde copolymer is a sulfanilamide-formaldehyde copolymer, the epoxy resin is a liquid glycidyl ether epoxy resin, and the polyol ester is a liquid ester.

10 Claims, No Drawings

NOVEL INTUMESCENT COMPOSITION

BACKGROUND OF THE INVENTION

1. Field of the Invention

This invention relates to intumescent amine-aldehyde copolymer/epoxy resin compositions and more particularly relates to such compositions having improved UV stability.

2. Description of the Prior Art

As taught in U.S. Pat. No. 3,899,546, valuable intumescent compositions may be obtained by the use of low molecular weight, water-insoluble amine-aldehyde copolymers consisting essentially of repeating units which correspond to the formula:

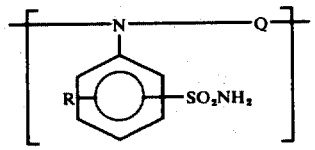

wherein Q is the residue of an alkanal containing 1–5 carbon atoms and R is hydrogen, alkyl, haloalkyl, alkoxy, haloalkoxy, halo, nitro acetamido, or sulfonamido, in conjunction with epoxy resins. These compositions are satisfactory for many applications but have the disadvantage of being susceptible to discoloration by ultra-violet light. Attempts to solve this problem by incorporation of conventional UV stabilizers have been unsuccessful.

SUMMARY OF THE INVENTION

An object of this invention is to provide novel intumescent compositions comprising amine-aldehyde copolymers and epoxy resins.

Another object is to provide such compositions having improved UV stability.

These and other objects are attained by incorporating about 0.5–75% by weight of a polyol polyacrylate or polyol polymethacrylate into an intumescent composition comprising (A) a water-insoluble amine-aldehyde copolymer having a number average molecular weight of about 350–2000 and consisting essentially of repeating units corresponding to the formula:

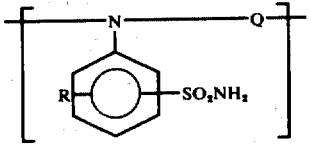

wherein Q is the residue of an alkanal containing 1–5 carbon atoms and R is hydrogen, alkyl, haloalkyl, alkoxy, haloalkoxy, halo, nitro, acetamido, or sulfonamido and (B) an epoxy resin.

DESCRIPTION OF THE PREFERRED EMBODIMENTS

The amine-aldehyde copolymer/epoxy resin compositions which are modified in accordance with the present invention are basically the preferred compositions of U.S. Pat. 3,899,546 except that the curing agent of the patented compositions is not an essential component of the compositions of the present invention. The teachings of U.S. Pat. No. 3,899,546 are incorporated herein by reference.

The amine-aldehyde copolymers of the invention are the preferred copolymers of U.S. Pat. Nos. 3,899,546 and 3,922,251, the teachings of which are also incorporated herein by reference. Briefly, they are water-insoluble, organic solvent-soluble copolymers of (A) a sulfanilamide-type amine, such as sulfanilamide, o-aminobenzenesulfonamide, m-aminobenzenesulfonamide, 4-amino2-ethylbenzenesulfonamide, 2-amino-3-chloromethylbenzenesulfonamide, 3-amino-2-butoxybenzenesulfonamide, 4-amino-3-bromomethoxybenzenesulfonamide, 4-amino-2-chlorobenzenesulfonamide, 2-amino-4-bromobenzenesulfonamide, 4-amino-2-nitrobenzenesulfonamide, 4-amino-2-acetamidobenzenesulfonamide, 4-amino-1,3-disulfonamidobenzene, etc., and mixtures thereof, and (B) an alkanal containing 1–5 carbon atoms, such as formaldehyde, acetaldehyde, propionaldehyde, butyraldehyde, pentaldehyde, and mixtures thereof. As indicated above, they have number average molecular weights of about 350–2000 and are characterized by having the sulfanilamide-type residues bonded to the aldehyde residues through the nitrogen of the amino group. They are preferably sulfanilamide-formaldehyde copolymers.

The epoxy resins of the invention, like those of U.S. Pat. No. 3,899,546, may be any of the glycidyl ether epoxy resins. Such resins are well known and are described, e.g., in Henry Lee and Kris Neville, "Epoxy Resins", McGraw-Hill Book Company, Inc. (New York), 1957; Irving Skeist, "Epoxy Resins," Reinhold Publishing Corporation (New York), 1958; William N. Bowie et al., "Epoxy Resins: Market Survey and Users' Reference, " Materials Research (Cambridge), 1959; R. A. Allen, "Epoxy Resins in Coatings," Federation of Societies for Paint Technology (Philadelphia), 1972; and Paul M. Craven, "Epoxy Resins," 1968–1969 MODERN PLASTICS ENCYLOPEDIA, pp. 160, 161, and 170–173, the teachings of which are incorporated herein by reference.

As taught in these references, the glycidyl ether epoxy resins may be liquid or solid, may have epoxide equivalent values of about 140–4000, and are obtained by condensing an epoxy compound, such as epichlorohydrin, dichlorohydrin, butadiene dioxide, diglycidyl ether, etc., with an aliphatic or aromatic polyol, such as bisphenol A [bis(4-hydroxyphenyl) dimethylmethane], tetrachlorobisphenol A, tetrabromobisphenol A, bisphenol F [bis(4-hydroxyphenyl) methane], bis(4-hydroxyphenyl) sulfone, resorcinol, hydroquinone, novolac resins, ethylene glycol, 2,3-butanediol, glycerol, etc. Any such resin may be employed in the practice of the invention, but the liquid resins having epoxide equivalent values of about 140-800 are usually preferred. Also, reaction products of epichlorohydrin with bisphenol A or glycerol are sometimes preferred because of their availability.

The polyol esters of the invention are polyacrylates and polymethacrylates of polyols, such as ethylene glycol, diethylene glycol, triethylene glycol, tetraethylene glycol, pentaerythritol, polyethylene glycols, 1,3-butylene glycol, 1,4-butylene glycol, 1,6-hexanediol, trimethylolpropane, a diglycidyl ether of bisphenol A, etc. Exemplary of such utilizable compounds are ethylene glycol diacrylate, diethylene glycol diacrylate, triethylene glycol diacrylate, tetraethylene glycol diacrylate, pentaerythritol tetraacrylate, polyethylene glycol 200 diacrylate, 1,3-butylene glycol diacrylate, 1,4-butylene glycol diacrylate, 1,6-hexanediol diacrylate, trimethylolpropane triacrylate, etc., the corresponding polymethacrylates, and mixtures thereof. Preferably they are liquid esters. The polyol ester is employed in an amount such as to constitute about 0.5–75%, preferably about 1–60%, and most preferably about 10–60%, based on the combined weights of the amine-aldehyde copolymer and the epoxy resin.

The compositions of the invention are prepared by blending the amine-aldehyde intumescent agent and the epoxy resin with the polyol ester UV stabilizer and any optional ingredients in any suitable manner, e.g., by liquid or dry blending of the ingredients at ambient or elevated temperatures, by dissolving the intumescent agent in a solvent, mixing the other ingredients therewith, and then evaporating the solvent by air- or oven-drying, etc. The quantities of ingredients employed are such as to provide intumescent agent/epoxy resin weight ratios between about 1/9 and 9/1, preferably about 1 3/1, and most preferably about 5/4.

The compositions may contain up to about 80%, based on the total weight of the composition, of one or more of the other ingredients conventionally used in intumescent and/or epoxy compositions. Such optional ingredients include, e.g., plasticizers, flexibilizers, stabilizers, dispersing agents, pigments, dyes, driers, biocides, anti-foamers, thickeners, protective colloids, fillers, reinforcements, blowing agents, spumifics, intumescing aids, other intumescent agents, flame retardants, thixotropic agents, diluents, etc.

As mentioned above, the curing agents of U.S. Pat. No. 3,899,546 are not essential components of the present compositions. However, it is sometimes desirable to employ them. When they are utilized, they may be any of the curing agents of the patent, preferably a polyamide, and they are ordinarily used in amounts smaller than the amounts employed in the patent.

When it is desired to use the compositions in the form of solutions, a solvent is employed in an amount such as to provide a solids content of about 10–90% by weight. Any solvent capable of dissolving the compositions may be employed. Such solvents include, e.g., acetone, dimethylformamide, dimethylsulfoxide, 2-methoxyethanol, dioxane, tetrahydrofuran, etc.

The compositions of the invention, like those of U.S. Pat. No. 3,899,546, may be used for molding, casting, potting, coating, etc. In a preferred embodiment of the invention, coatings are prepared by applying compositions to substrates in any suitable manner, e.g., electrodeposition, knife coating, calendering, spraying of powdered intumescent composition onto an adhesive surface, spraying of powdered intumescent composition onto a substrate to which it is adhered by subsequent melting and cooling, application of a hot melt, application of a paint, etc., to deposit coatings having dry thicknesses of about 0.02–19 mm.

Although, as indicated above, the compositions are useful in other applications, the invention is particularly advantageous in that it permits the formation of intumescent coatings having low moisture sensitivity; good adherence to substrates, such as wood, paper, metal and plastics; and better UV stability than the compositions of U.S. Pat. No. 3,899,546.

The following examples are given to illustrate the invention and are not intended as a limitation thereof. Unless otherwise specified, quantities mentioned are quantities by weight. The sulfanilamide-formaldehyde copolymer of the examples is a copolymer having a number average molecular weight of about 350–2000 and prepared in accordance with the teachings of U.S. Pat. No. 3,922,251 so that the sufanilamide units correspond to the formula:

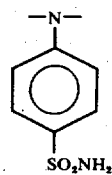

EXAMPLE I - CONTROL

Dissolve 70 parts of sulfanilamide-formaldehyde copolymer in 88 parts of an 83/2.5/2.5 mixture of 2-methoxyethanol, 2-nitropropane, and butyl acetate. While agitating the solution, add 30 parts of a diglycidyl ether of bisphenol A having an epoxide equivalent of 190. Apply the composition to Morest paper to form a coating. After the coating has hardened, place the coated paper in a fadeometer and subject it to ultraviolet light for 210 hours. Then measure the DCYB (difference in color between yellow and blue) with a spectrophotometer. The coated paper is yellow and has an assigned DCYB value of O MacAdam unit.

EXAMPLE II

Repeat Example I except for mixing 5 parts of a commercial diacrylate of a liquid diglycidyl ether of bisphenol A with the copolymer/epoxy resin composition before applying it to Morest paper. After the UV exposure, the coated paper is less yellow than the control and has a DCYB value of -17.9 MacAdam units.

EXAMPLE III

Repeat Example II except for using 60 parts of the diacrylate. After the UV exposure, the coated paper is even less yellow than the coated paper of Example II.

EXAMPLE IV

Repeat Example I except for mixing 5 parts of trimethylolpropane triacrylate with the copolymer/epoxy resin composition before applying it to Morest paper. After the UV exposure, the coated paper is less yellow than the control and has a DCYB value of −32.8 MacAdam units.

EXAMPLE V

Repeat Example I except for mixing 5 parts of pentaerythritol tetraacrylate with the copolymer/epoxy resin composition before applying it to Morest paper. After the UV exposure, the coated paper is less yellow than the control and has a DCYB value of −30.0 MacAdam units.

EXAMPLE VI

Dissolve 80 parts of a sulfanilamide-formaldehyde copolymer in 85 parts of an 80/5 mixture of 2-methoxyethanol and 2-nitropropane. While agitating the solution, add 20 parts of a diglycidyl ether of bisphenol A having an epoxide equivalent of 190, 24 parts of a commercial diacrylate of a liquid diglycidyl ether of bisphenol A, 10 parts of tris(2,3-dibromopropyl)phosphate, and 3 parts of tricresyl phosphate. Then add 10 parts of a polyamide hardener. Apply the composition to a poplar panel and allow it to harden. The coated panel is less yellow after UV exposure than a comparable coated panel of U.S. Pat. No. 3,899,546 and, like the coated panels of that patent, exhibits excellent intumescence when tested in accordance with the 2-foot tunnel test described in H. L. Vandersall, "The Use of a Small Flame Tunnel for Evaluating Fire Hazard," JOURNAL OF PAINT TECHNOLOGY, Vol. 39, No. 55, pp. 494–500 (1967).

Similar results are observed when the examples are repeated except that the polyol polyacrylates of the examples are replaced by the polyacrylates and polymethacrylates taught to be their equivalents in the specification.

It is obvious that many variations may be made in the products and processes set forth above without departing from the spirit and scope of this invention.

What is claimed is:

1. A composition comprising (A) about 1-9 parts by weight of a water-insoluble amine-aldehyde copolymer having a number average molecular weight of about 350-2000 and consisting essentially of repeating units corresponding to the formula:

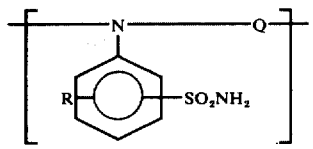

wherein Q is the residue of an alkanal containing 1-5 carbon atoms and R is hydrogen, alkyl, haloalkyl, alkoxy, haloalkoxy, halo, nitro, acetamido, or sulfonamido, (B) respectively, about 9-1 parts by weight of an epoxy resin which is polyglycidyl ether of an aliphatic or aromatic polyol, and (C) about 0.5-75%, based on the combined weights of the amine-aldehyde resin and the epoxy resin, of a polyol ester selected from the group consisting of polyacrylates and polymethacrylates.

2. The composition of claim 1 wherein the concentration of polyol ester is about 1-60%, based on the combined weights of the amine-aldehyde resin and the epoxy resin.

3. The composition of claim 2 wherein the concentration of polyol ester is about 10-60%, based on the combined weights of the amine-aldehyde resin and the epoxy resin.

4. The composition of claim 1 wherein the polyol ester is a liquid ester.

5. The composition of claim 4 wherein the polyol ester is a diacrylate of a liquid diglycidyl ether of bisphenol A.

6. The composition of claim 4 wherein the polyol ester is trimethylolpropane triacrylate.

7. The composition of claim 4 wherein the polyol ester is pentaerythritol tetraacrylate.

8. The composition of claim 1 wherein the repeating units of the copolymer correspond to the formula:

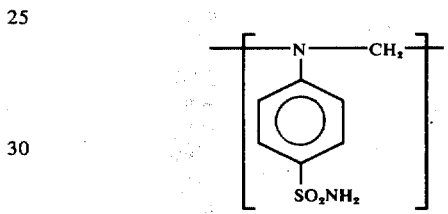

9. The composition of claim 1 wherein the epoxy resin is a liquid glycidyl ether epoxy resin.

10. The composition of claim 9 wherein the epoxy resin is a diglycidyl ether of bisphenol A.